(12) United States Patent
Siddiqui

(10) Patent No.: US 8,977,483 B2
(45) Date of Patent: Mar. 10, 2015

(54) METHODS AND APPARATUS FOR BEACON CODE CHANGES IN AN AIR TRAFFIC CONTROL SYSTEM

(71) Applicant: Raytheon Company, Waltham, MA (US)

(72) Inventor: Kaiser Siddiqui, Acton, MA (US)

(73) Assignee: Raytheon Company, Waltham, MA (US)

( * ) Notice: Subject to any disclaimer, the term of this patent is extended or adjusted under 35 U.S.C. 154(b) by 6 days.

(21) Appl. No.: 13/922,650

(22) Filed: Jun. 20, 2013

(65) Prior Publication Data

US 2014/0379245 A1 Dec. 25, 2014

(51) Int. Cl.
*G08G 5/00* (2006.01)
*G01S 13/75* (2006.01)

(52) U.S. Cl.
CPC ............. *G08G 5/003* (2013.01); *G08G 5/0013* (2013.01); *G01S 13/751* (2013.01); *G08G 5/0021* (2013.01)
USPC .......................................... 701/120; 340/945

(58) Field of Classification Search
CPC ..... G01S 13/75; G01S 13/751; G01S 13/767; G08G 5/0095; G08G 5/0013; G08G 5/003; G08G 5/0021; G08G 5/0082
See application file for complete search history.

(56) References Cited

U.S. PATENT DOCUMENTS

| | | | |
|---|---|---|---|
| 5,515,061 A | 5/1996 | Hiltz et al. | |
| 6,828,921 B2 | 12/2004 | Brown et al. | |
| 7,132,982 B2 | 11/2006 | Smith et al. | |
| 7,248,219 B2 | 7/2007 | Smith et al. | |
| 7,301,453 B2 | 11/2007 | Fry | |
| 7,363,119 B2 * | 4/2008 | Griffin et al. | 701/3 |
| 7,612,716 B2 | 11/2009 | Smith et al. | |
| 7,619,555 B2 * | 11/2009 | Rolfe | 342/29 |
| 7,746,268 B2 | 6/2010 | Ino | |
| 7,778,768 B2 | 8/2010 | Barry et al. | |
| 7,889,115 B2 * | 2/2011 | Clingman et al. | 342/42 |
| 7,889,133 B2 | 2/2011 | Smith et al. | |
| 7,890,247 B2 | 2/2011 | Cole | |
| 8,054,215 B2 | 11/2011 | Abbett et al. | |
| 8,068,039 B2 | 11/2011 | Cole et al. | |
| 8,145,511 B2 | 3/2012 | Dunsky | |
| 8,253,541 B2 | 8/2012 | Chan et al. | |
| 2004/0148065 A1 * | 7/2004 | Andrews et al. | 701/3 |
| 2008/0065275 A1 * | 3/2008 | Vizzini | 701/2 |

* cited by examiner

*Primary Examiner* — Michael J Zanelli
(74) *Attorney, Agent, or Firm* — Daly, Crowley, Mofford & Durkee, LLP

(57) ABSTRACT

Methods and apparatus for enabling an air traffic control system to set a beacon code on a transponder of an aircraft without voice communication with the flight crew. In one embodiment, an air traffic control system receives a flight plan from an aircraft, relays clearance of the flight plan to the aircraft, sets a beacon code on a transponder on the aircraft without voice communication, receives an acknowledgement of the beacon code setting from the aircraft, sends an acknowledgement to the aircraft, sets a new beacon code on the transponder without voice communication and receives a new acknowledgement of the new beacon code from the aircraft.

16 Claims, 9 Drawing Sheets

METHODS AND APPARATUS FOR BEACON CODE CHANGES IN AN AIR TRAFFIC CONTROL SYSTEM

BACKGROUND

As is known in the art, aircraft file flight plans with an air traffic control (ATC) system prior to take off. This is mandatory if the flight is operating under Instrument Flight Rules (IFR) and optional if operating under Visual Flight Rules (VFR). A beacon code is assigned to the aircraft by the ATC system to enable the ATC system to track the aircraft during a flight. This, code, which is stored in a transponder on the aircraft, links a track and a flight plan to enable air traffic control to identify a target in an airspace. Typically, a beacon code is given to the flight crew by clearance delivery for a flight conducted under IFR as part of the clearance process. The clearance may also be given to the flight crew by the tower during the hold for the departing runway. Once issued, the beacon code stays with the aircraft through the entire route. However, there are cases where the beacon code is re-assigned, such as when a flight passes from one air traffic center to another. For flights operating under VFR the standard beacon code in the United States is 1200. If the flight crew of the VFR flight requires ATC assistance, they typically request flight following (or Flight Information Service in the United Kingdom) in which case the controller allocates to the flight a specific beacon code which should stay with the flight throughout the route. This may not be the case as the flight transitions through several centers and each center may allocate a different beacon code to the flight.

An unnecessary by-product of flight crew changing beacon codes is that the transponder may cycle through an emergency code inadvertently (i.e. 7500, 7600 or 7700). This invariably causes nuisance alerts on the ATC system controlling the flight. This problem occurs most often on older transponders that have rotary dial modulation of the individual digits that comprise the beacon code.

Newer transponder equipment is digital so that the flight crew types in the numbers for the code which eliminates the cycling through emergency codes inadvertently. However, there is still controller flight crew voice chatter required, On occasion, the flight crew may read back the wrong beacon code verbally provided by air traffic control, especially between a flight crew and controllers in situations where language is an issue. Further conversation is then required to correct the misinformation all of which distracts the flight crew and/or controllers from other tasks.

SUMMARY

The present invention provides method and apparatus for enabling beacon code updates in an aircraft transponder by an air traffic control system without voice communications. With this arrangement, beacon code changes for an aircraft can be made without user error or voice chatter to enhance flight safety. While exemplary embodiments of the invention are shown and described having certain components, processing, and configurations, it is understood that embodiments of the invention are applicable to avionics messaging in general in which it is desirable to reduce voice communications between a flight crew and an air traffic control system.

In one aspect of the invention, a method comprises: receiving a flight plan from an aircraft, relaying, using a computer processor, clearance of the flight plan to the aircraft, setting a beacon code on a transponder on the aircraft without voice communication, receiving an acknowledgement of the beacon code setting from the aircraft, sending an acknowledgement to the aircraft, setting a new beacon code on the transponder without voice communication, and receiving a new acknowledgement of the new beacon code from the aircraft.

The method can further include one or more of the following features: setting the new beacon code when the aircraft is en route, generating information for a user interface to display an indication that the transponder on the aircraft is capable of receiving beacon code updates without voice communication, setting the new beacon code in response to a request from the aircraft, maintaining a database of aircraft call signs and associated beacon codes, and/or communicating with the aircraft via a datalink.

In another aspect of the invention, an air traffic control system, comprises: a flight data processor to process flight plan for an aircraft, a beacon code module coupled to the flight data processor, the flight data processor and the beacon code module configured to: receive a flight plan from the aircraft, relay clearance of the flight plan to the aircraft, set a beacon code on a transponder on the aircraft without voice communication, receive an acknowledgement of the beacon code setting from the aircraft, send an acknowledgement to the aircraft, set a new beacon code on the transponder without voice communication, and receive a new acknowledgement of the new beacon code from the aircraft.

The system can further include one or more of the following features: the beacon code module is further configured to set the new beacon code when the aircraft is en route, a display having an indicator for indicating whether the transponder on the aircraft is capable of receiving beacon code updates without voice communication, a database of aircraft call signs and associated beacon codes, the beacon code module is further configured to generate a beacon code change message with information to enable the aircraft to translate the message for processing by the transponder, and/or the beacon code module is further configured to set the new beacon code in response to a request from the aircraft.

In a farther aspect of the invention, a method comprises: receiving, by a transponder on an aircraft, a beacon code change from an air traffic control system, receiving a confirmation indication from a user for the beacon code change, updating the beacon code based on the beacon code change without voice communication with air traffic control, and generating a confirmation message of the beacon code update to the air traffic control.

The method can further include one or more of the following features: the transponder is configured to receive datalink messages from the air traffic control system, the transponder is configured to receive a new beacon code change when the aircraft is en route, updating the new beacon code in the transponder without voice communication, receiving user confirmation for the new beacon code, and/or providing an indicator to indicate that a beacon code change has been sent by the air traffic control.

BRIEF DESCRIPTION OF THE DRAWINGS

The foregoing features of this invention, as well as the invention itself, may be more fully understood from the following description of the drawings in which.

DETAILED DESCRIPTION

Figure 1:
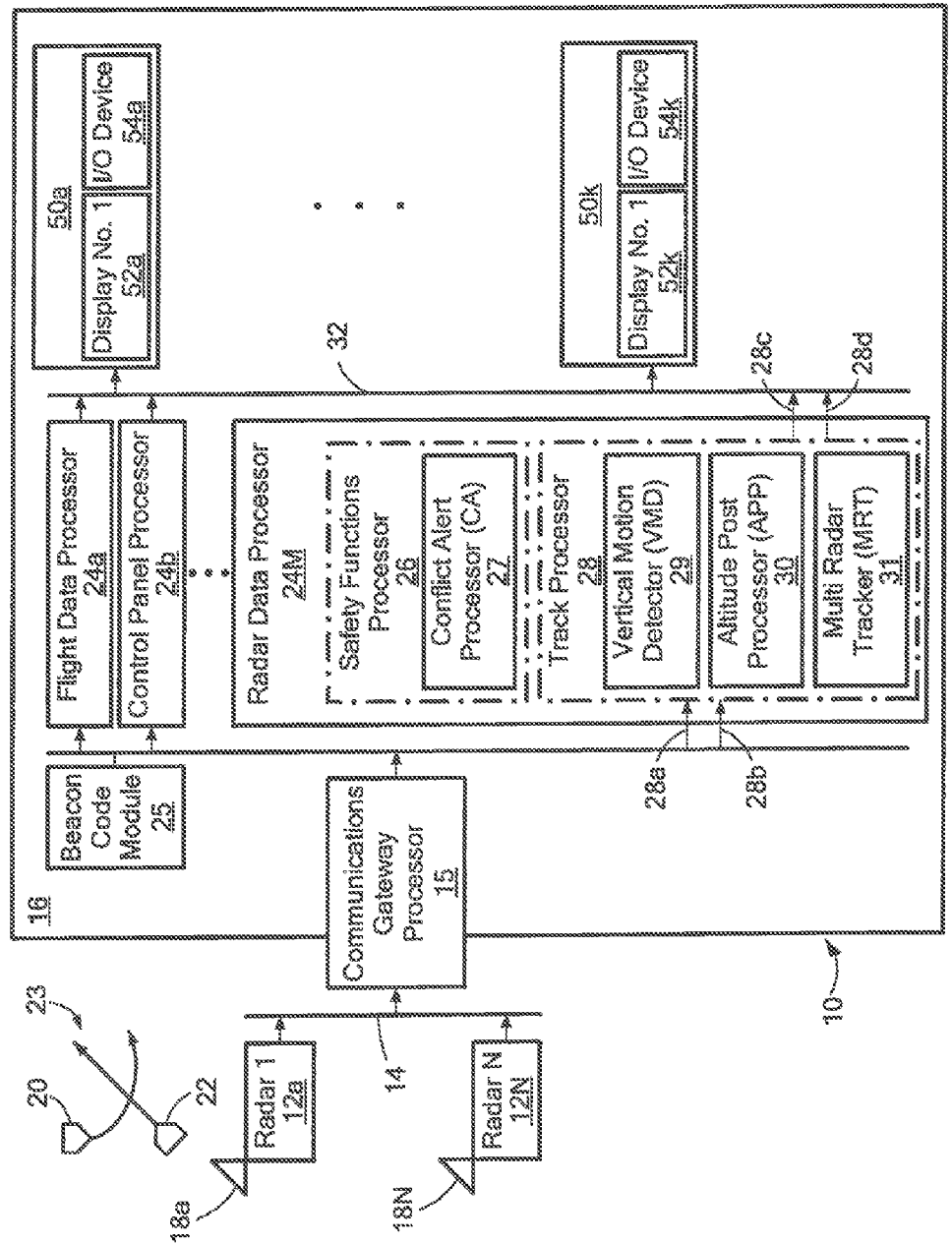
FIG. 1 is a schematic representation of an air traffic control system having beacon code change capability in accordance with exemplary embodiments of the invention.

FIG. 1 shows an exemplary air traffic control (ATC) system 10 having beacon code modification in accordance with exemplary embodiments of the invention. The ATC system 10 includes one or more radar systems 12a-12N generally denoted 12 coupled via a network 14 which may be provided for example, as a local area network, and a communications gateway processor 15 to an air traffic control (ATC) system 16. In the case where multiple radar systems 12 exist, each of the radar systems 12 may he located at different physical locations to provide substantially continuous radar coverage over a geographic area larger than that which could be covered by any single one of the radar systems 12. In general, there is likely to be overlap in coverage between some of the radar systems In operation, each of the radar systems 12 emits radio frequency (RE) signals into a predetermined spatial region through a corresponding one of antennas 18a-18N as is generally known. Portions of the emitted RF signals intercept targets 20, 22 which may correspond, for example, to aircraft flying in the predetermined spatial region. Those portions of the emitted RF signals which intercept the targets 20, 22 are reflected from the targets 20, 22 as return or target signals which are received by respective ones of the radars 12.

Each of the targets 20, 22 includes a transponder, and the RF signal emitted by the radar system 12 includes an interrogation signal. The interrogation signal interrogates the transponder on the target 20, 22 and in response to an appropriate interrogation signal, the transponder transmits the response signal from the target 20, 22 to the respective radar system 12. Thus, first portions of the return or target signal received by the respective ones of the radars 12 may correspond to portions of the RF signal reflected from the targets 20, 22 and second portions of the target signal can correspond to a response signal emitted from the transponder on the target. The transponder response signal includes Mode C altimeter information, which describes the altitude of the aircraft in digital numerical format.

Each of the one or more radar systems 12 feeds the target data signals through the communications gateway processor 15 to the ATC system 16. The ATC system 16 includes one or more processors 24a-24M each of which performs a particular function, Here, ATC system 16 is shown to include a flight data processor 24a for processing flight-plan data submitted by aircraft personnel to designate routes, a control panel processor 24b to provide appropriately processed information to be displayed on one or more displays 52a-52K, and a radar data processor 24M which processes target data sigials. In an exemplary embodiment, the flight data processor 24a includes a beacon code module 25 that can form a part of, or be coupled to, the flight data processor 24a.

The radar data processor 24M includes a safety functions processor 26 that in turn includes a conflict alert (CA) processor 27. The radar processor 24M can also include a track processor 28 that in turn includes a multi-radar tracker (MRT) 31, a vertical motion detector (VMD) 29, and an altitude post processor (APP) 30.

Those of ordinary skill in the art will appreciate of course that ATC system 16 may include more or fewer processors depending upon the particular application. For example, in some embodiments it may be desirable to utilize a single processor that concurrently performs all the functions to be performed by ATC system 16.

The processors 24 are coupled over a network 32 to the one or more input/output (I/O) systems 50a-50K generally denoted 50. Taking I/O system 50a as representative of systems 50b-50K, each I/O system 50 includes a processor and any other hardware and software necessary to provide a graphical user interface (GUI), Each IAD system includes a display 52a which can have coupled thereto an input device 54a which may be provided, for example, as a keyboard and a pointing device well known to those of ordinary skill in the art, which interfaces with the graphical user interface (GUI) of the display 52a. Those of ordinary skill. in the art will appreciate, of course, that other input devices may also be used. The displays 52 may be located at different physical locations.

Among other things, the ATC system 16 maintains and updates the target data fed thereto to this maintain the location and speed of targets detected and tracked by the radar system portion of the air traffic control system. In performing this function, the ATC system typically assigns a unique identifier in the form of a beacon code to each tracked target.

In general, the ATC system 10 is configured to communicate with aircraft 10 to direct takeoffs, landings, approaches, etc., in a safe manner. The ATC system 10 exchanges information with the aircraft 20, 22 to enable the system to track aircraft in within the coverage area of the system.

In an exemplary embodiment, the beacon code module 25 reduces the flight crew workload in the cockpit and the amount of voice communication between a controller and the flight crew for changes to beacon codes by allowing the air traffic control system to automatically set the beacon code in the aircraft transponder. After the beacon code is set, the flight crew and controller acknowledge the beacon code setting. In addition, the disadvantages of manual code setting are avoided.

Figure 2:
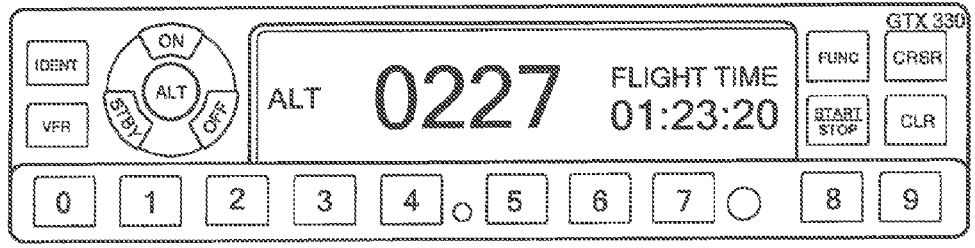
FIG. 2 is a pictorial representation of an exemplary aircraft transponder that can receive beacon code updates from an air traffic control system.

The ATC system controller 10, flight data processor 24a, and beacon code module 25 can remotely set the beacon code in a designated aircraft as needed, such as at departure, en route, and approach. The flight crew can be notified in a variety of ways including ACARS and/or via a display screen in a glass cockpit environment, FIG. 2 shows an exemplary display including a beacon code set on the aircraft transponder. The flight crew acknowledges awareness of the new code by relaying an acknowledgement back to the controller so that controller knows that the flight crew is aware of the setting. In exemplary embodiments of the invention, the transponder includes a manual override to provide the flight crew with a safety measure in case of equipment malfunction, for example.

By allowing the ATC system to set the beacon code, the flight crew workload is reduced by eliminating the need to receive a beacon code via voice transmission, reading it back to the controller via voice transmission, and setting the code on the transponder in the aircraft. In addition, safety is enhanced due to a reduction in erroneous code input or reading back an incorrect code, which leads to unnecessary radio chatter. In exemplary embodiments, the equipage code for the aircraft (nominally communicated through the filed flight plan) includes an indication that the aircraft has the required transponder that allows ground manipulation of the beacon code by the air traffic control system.

Figure 3:
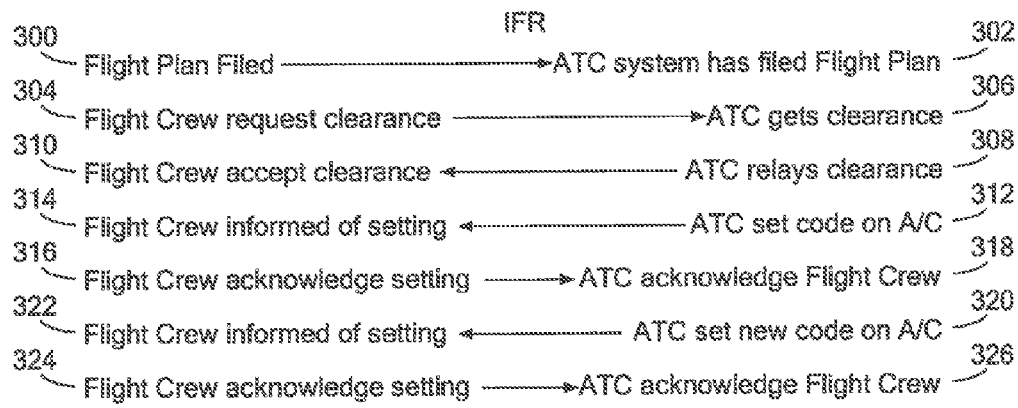
FIG. 3 shows an exemplary sequence of steps for providing beacon code changes for an IFR flight.
Figure 3A:
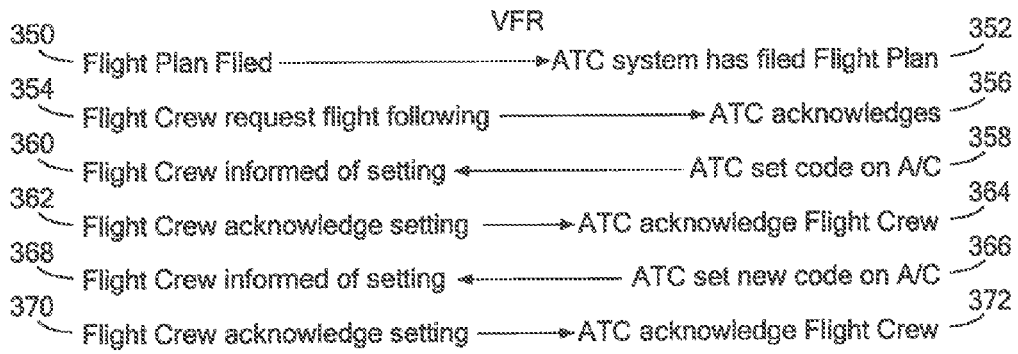
FIG. 3A shows an exemplary sequence of steps for providing beacon code changes for a VFR flight.

FIG. 3 shows an exemplary sequence diagram for message transactions for an IFR flight. In step 300, a flight plan for an aircraft is filed and in step 302 the ATC system processes the flight plan. In step 304, the aircraft flight crew requests clearance for the flight and the ATC system obtains clearance for the flight in step 306. In step 308, the ATC system relays the clearance and in step 310, the flight crew accepts the clearance from the ATC system, In step 312, the ATC system sets a beacon code for the aircraft, in step 314 the flight crew is informed of the code setting, in step 316, the flight crew acknowledges the setting, and in step 318 the ATC acknowledges the flight crew, In step 320, the ATC system sets a new beacon code and in step 322 the flight crew is informed of the new setting, In step 324, the flight crew acknowledges the new setting and in step 326 the ATC system acknowledges the flight crew.

FIG, 3A shows an exemplary sequence diagram for message transactions for an VFR flight having some commonality with the transactions in FIG. 3 for an IFR flight. In step 350, a flight plan is filed and in step 352 the ATC system files the flight plan. In step 354 the flight crew requests flight following from the ATC system and in step 356 the ATC system acknowledges the request. In step 358, the ATC system sets the beacon code the aircraft and in step 360 the flight crew is informed of the setting. In step 362, the flight crew acknowledges the setting and in step 364 the ATC system acknowledges the flight crew. In step 366, the ATC system sets a new beacon code on the aircraft, It is understood that the beacon code can be changed prior to takeoff, en route, or approach. In step 368, the flight crew is informed of the new setting. In step 370, the flight crew acknowledges the new setting and in step 372 the ATC system acknowledges the flight crew. It is understood that further beacon code changes can be made by the ATC system.

Figure 3B:
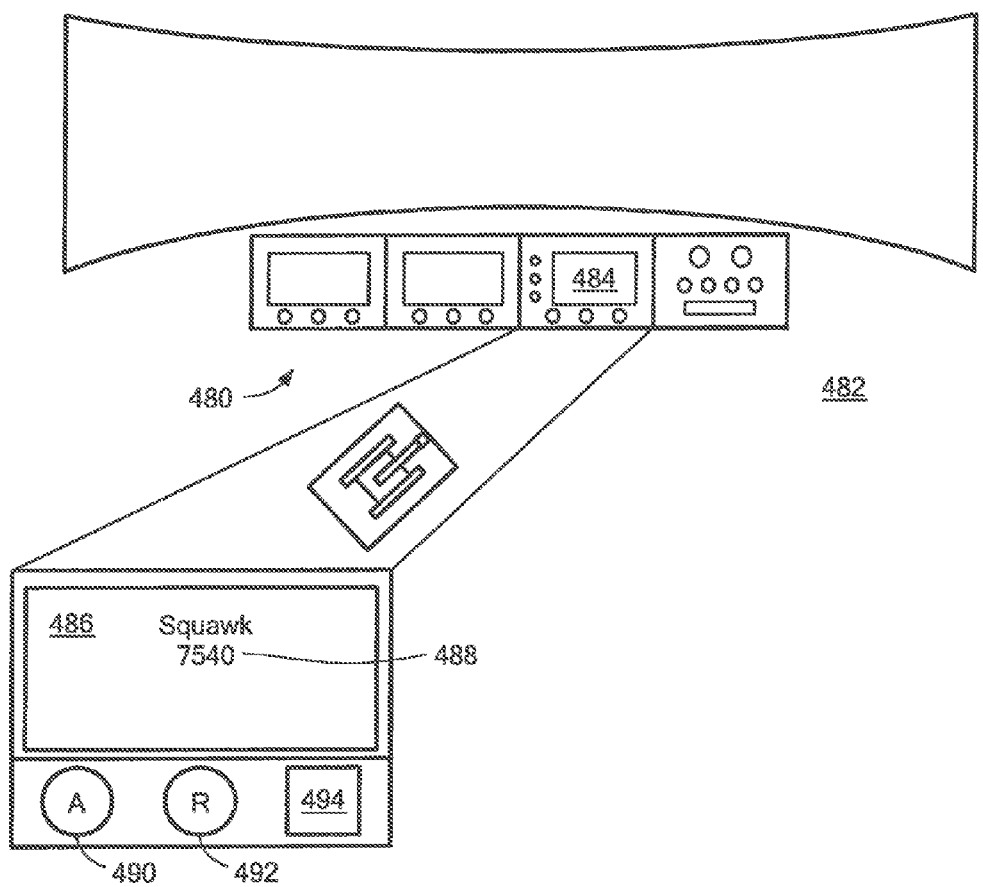
FIG. 3B shows an exemplary transponder display forming a part of an avionics system.

FIG. 3B shows an exemplary avionics system 480 in an aircraft cockpit 482 including a transponder 484, In an exemplary embodiment, the transponder 484 includes a display 486 to show a beacon code 488, for example, along with an accept button 490, a reject button 492, and an alert indicator 494, which can be provided as a flashing red light when activated, for example. When the air traffic control system sets the beacon code, such as in step 312 in FIG. 3, the alert indicator 494 is activated to inform the flight crew that a beacon code has been set. The flight crew can acknowledge the beacon code setting (step 316) by pushing the accept button 490, for example. For the acceptance by the flight crew, while the transaction is in process, the data tag of the flight is highlighted in the ATC system. Once the aircrew acknowledges the code change on the transponder, a signal is sent back to the ATC system which un-highlights the data tag for the aircraft. This does not affect the tracking aspect of the code change as the interrogation of the aircraft based on the new code is a separate process.

Figure 4:
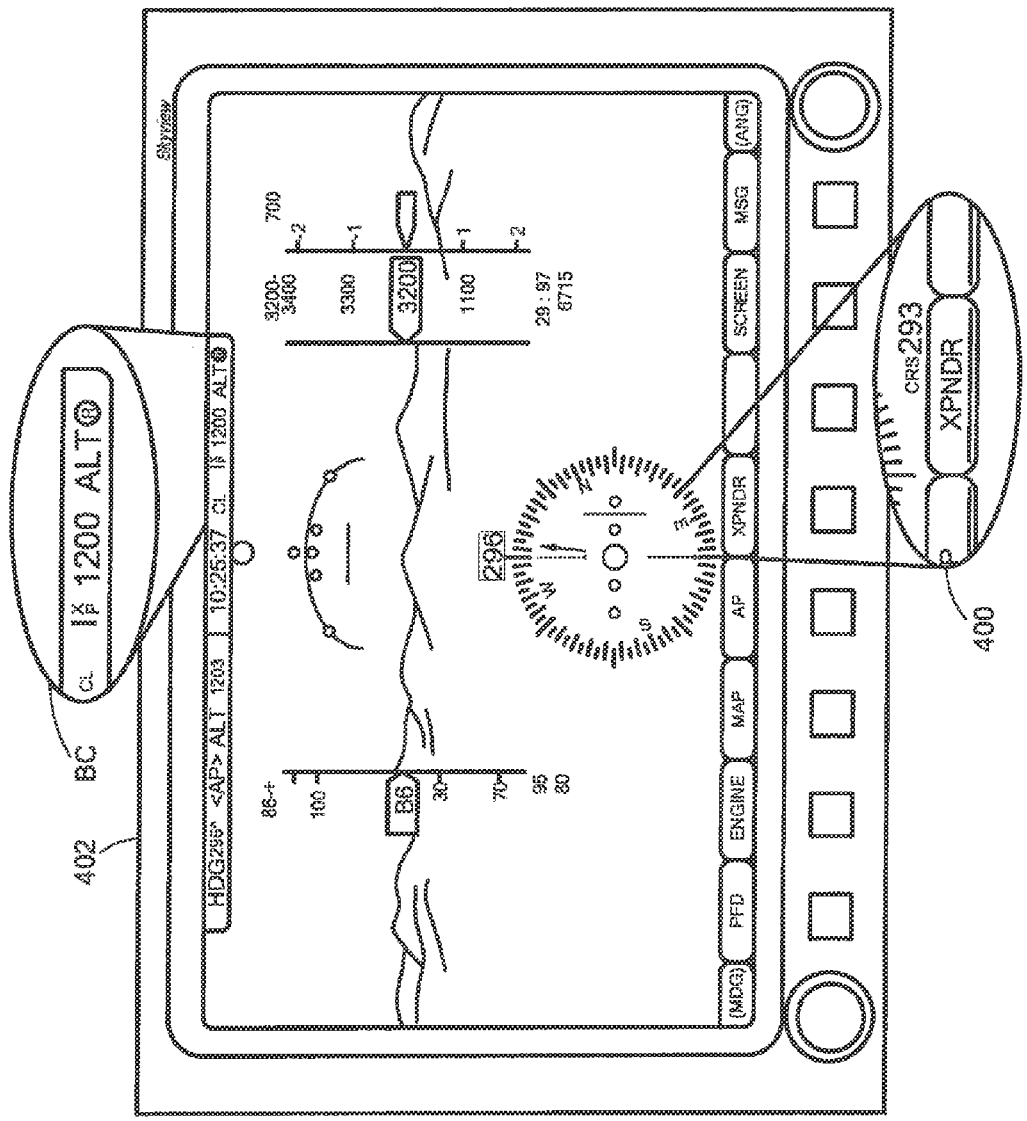
FIG. 4 shows an exemplary representation of an avionics package having beacon code update capability.

FIG. 4 shows an exemplary transponder 400 integrated into an avionics platform 402 in a cockpit. In the illustrated embodiment, the transponder 400 is a panel-mounted Mode S digital transponder with traffic datalink capability. The transponder 400 includes dedicated pushbutton keys for squawk code selection. The beacon code BC is shown at the top of the display.

Figure 5:
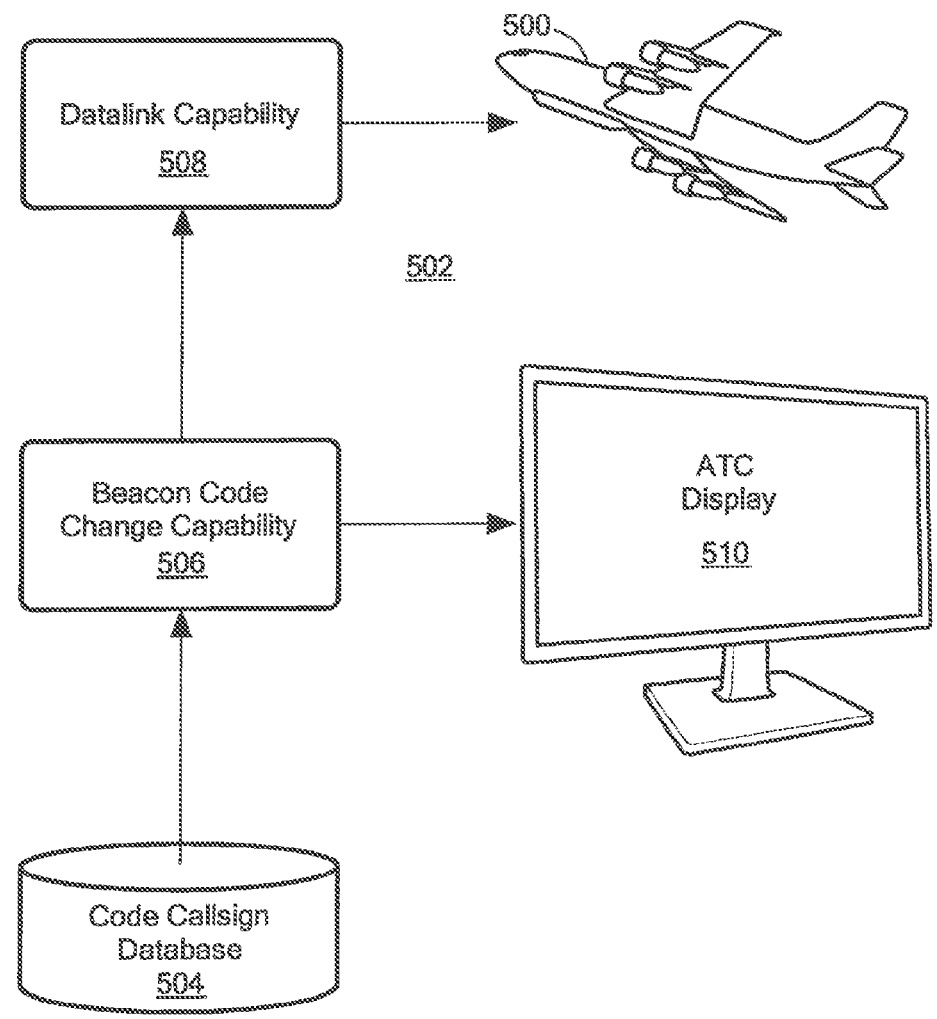
FIG. 5 is a schematic representation of exemplary data flow between an ATC system and an aircraft when updating beacon codes.

FIG. 5 shows an exemplary flow diagram of information between an aircraft 500 and an ATC system 502. A code call sign database 504 contains call sign codes for aircraft under management of the ATC system. A beacon code change capability module 506 interacts with the code callsign database 504 to manage the assignment of beacon codes to the aircraft. A datalink module 508 coupled to the beacon code module 506 provides a communication link between the aircraft 500 and the ATC system. An ATC display 510 enables a user, such as an air traffic controller to view information relation to various aircraft including beacon codes.

Figure 6:
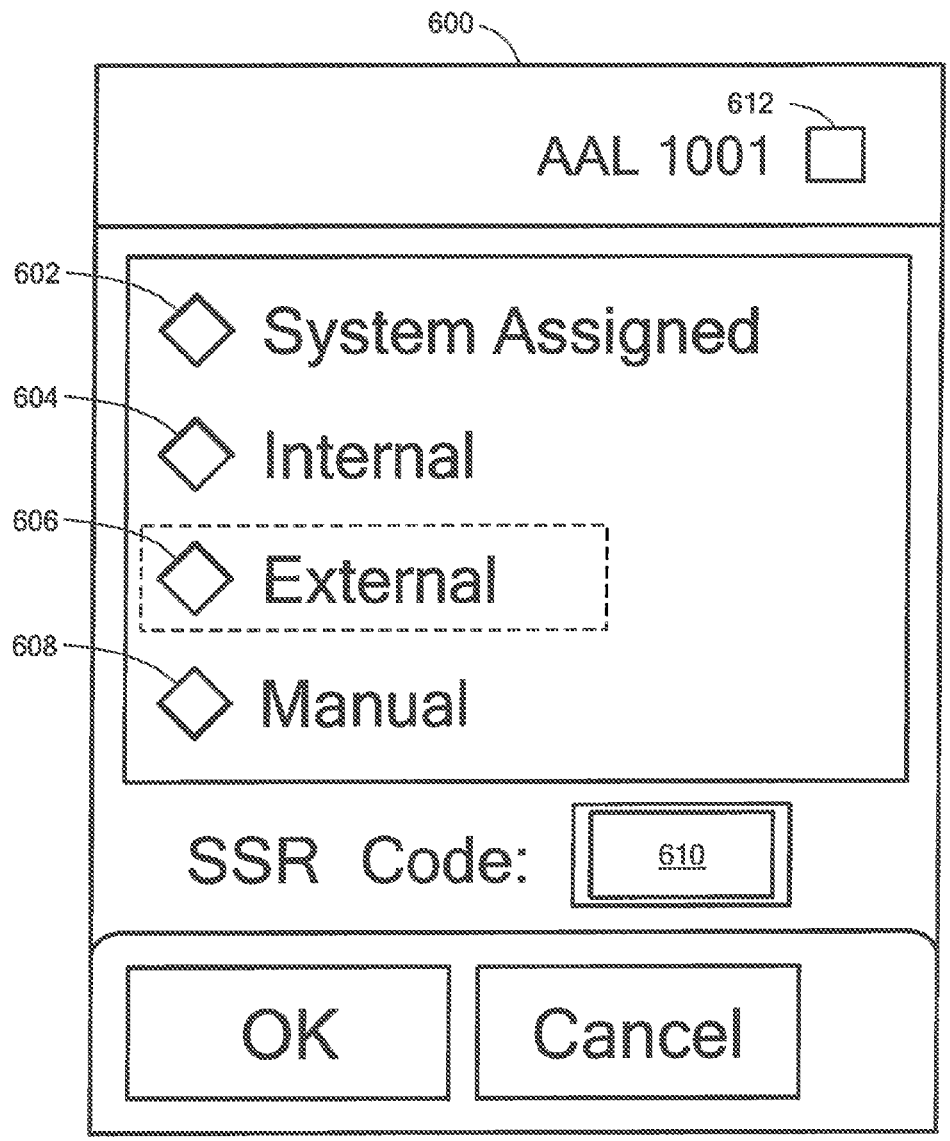
FIG. 6 is an exemplary user interface screen for code entry.

FIG. 6 shows an exemplary user interface 600 to enable ATC assignment of a beacon code for an aircraft, The user can select a mode in which a code is assigned. Exemplary modes include system assignment 602, internal assignment 604, external assignment 606, and manual assignment 608. A field 610 is provided to enable a user to enter a code, such as for manual mode. In an exemplary embodiment, the display 600 includes an indicator 612 located next to the callsign of the aircraft to indicate. that the avionics of the aircraft is able to handle transponder changes via datalink from the ground. In one embodiment, the user interface display 600 is provided as part of an air traffic control system. The system assigned 602 field is a code that is selected by the ATC system, The internal code 604 is from a pool of codes in the database that are tagged for aircraft that remain within the Flight Information region (FIR, i.e. internal US flights). These are controller set based on a list of codes that the controller has available for allocation. The external code 606 is tagged for flights that leave the FIR (i.e. international flights). The manual code 608 can be set at will by an air traffic controller.

Figure 7:
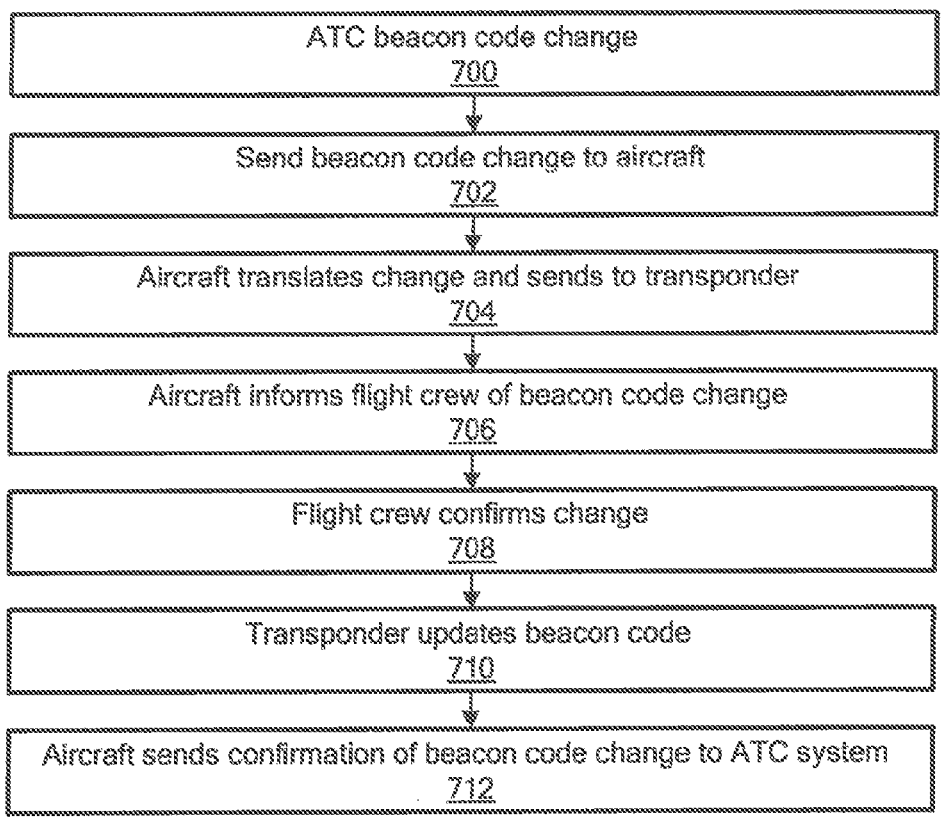
FIG. 7 is a flow diagram showing an exemplary sequence of steps for implementing a beacon code change for a transponder in accordance with exemplary embodiments of the invention.

FIG. 7 shows an exemplary sequence of steps for transponder processing of a beacon code change by the ATC system. In step 700, the ATC system makes a beacon code change for an aircraft. In step 702, the ATC system sends the beacon code change to aircraft, such as via the datalink interface with the aircraft. In step 704, aircraft translates the beacon code change message and sends to the aircraft transponder. In general, messages from the datalink are processed by the onboard avionics systems, and if appropriate, relayed to the target component, e,g., line-replaceable unit (LRU). In one embodiment, messages are translated into ARINC 429 labels, In step 706, the aircraft, such as via the avionics system and/or transponder, informs the flight crew that a beacon code change has been made by the ATC system, In step 708, the flight crew confirms the beacon code change, such as by pushing an accept button on the transponder. In step 710, the transponder makes the beacon code change and updates the display to reflect the new beacon code. In step 712, the aircraft send a confirmation of beacon code acceptance to the ATC system via the datalink sytem.

Figure 8:
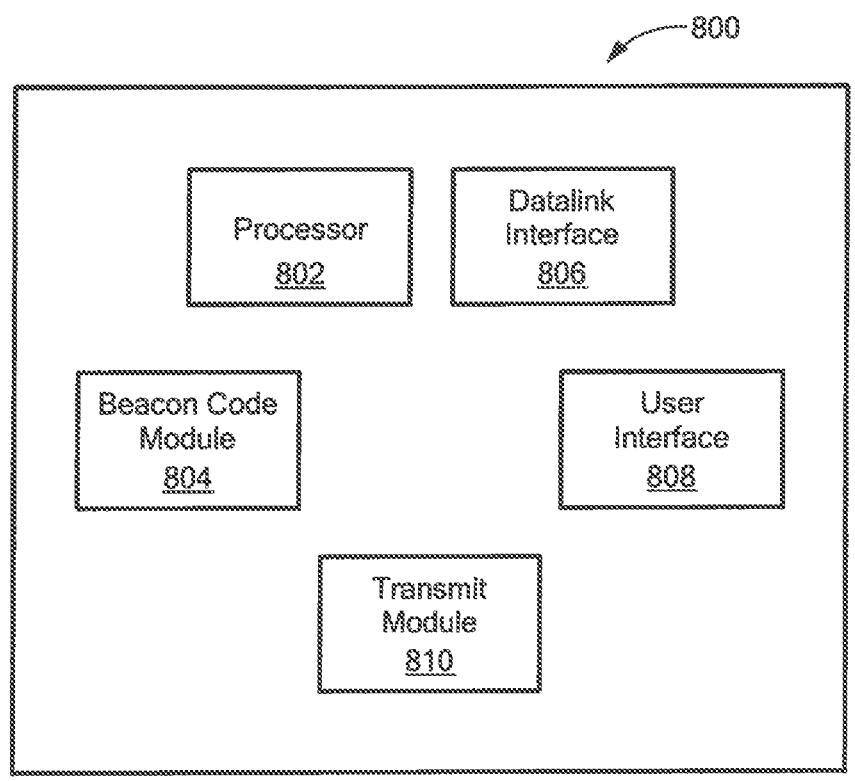
FIG. 8 is a block diagram of an exemplary transponder that can accept beacon code changes in accordance with exemplary embodiments of the invention.

FIG. 8 shows an exemplary transponder 800 having beacon code update capability in accordance with exemplary embodiments of the invention. A processor 802 controls overall operation of the transponder. A beacon code module 804 receives instructions from a datalink interface 806, which enables communications with the ATC system. A user interface 808 enables a user to interact with the transponder, such as setting beacon codes and accepting beacon code changes from the ATC system. A transmit module 810 effects transmission of the beacon code for reception by the ATC system.

Figure 9:
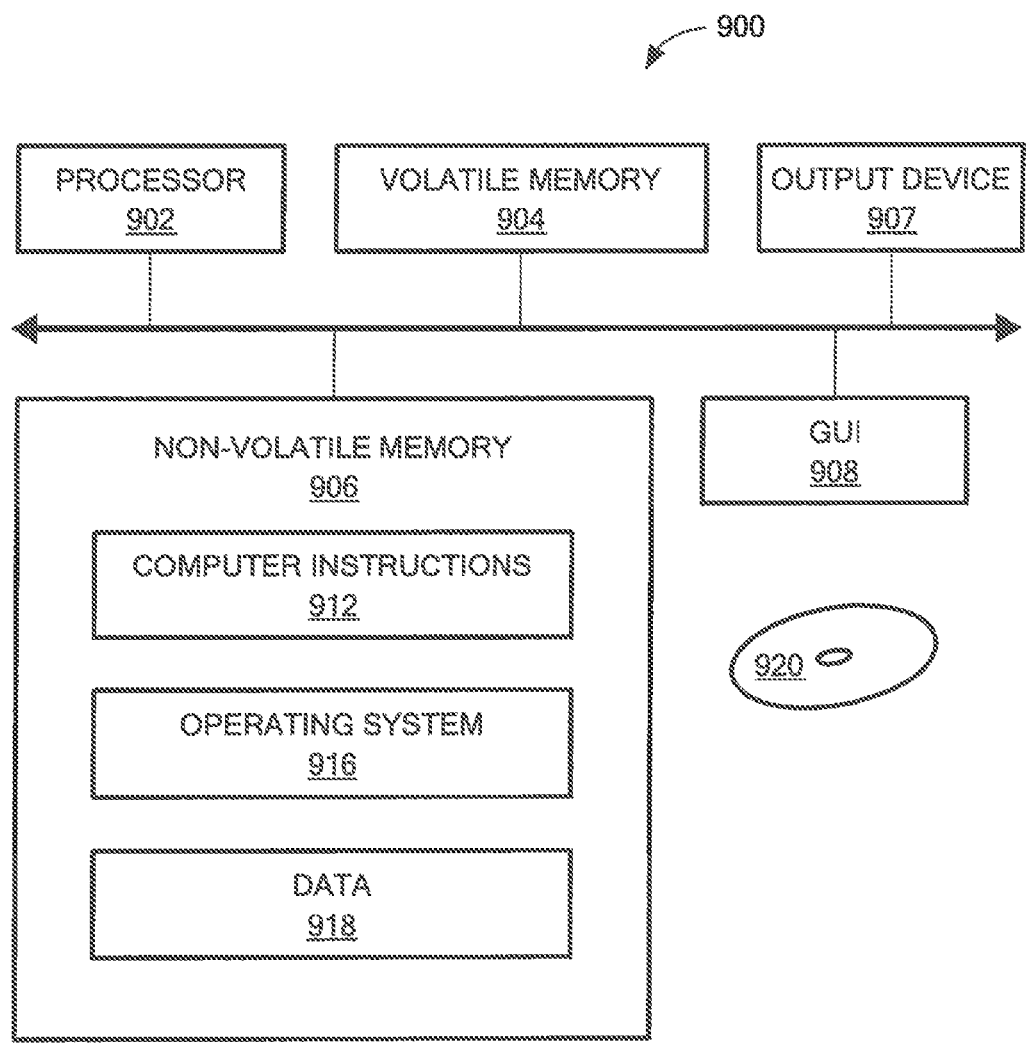
FIG. 9 is an exemplary computer that can perform at least a portion of the processing described herein.

FIG. 9 shows an exemplary computer 700 that can perform at least part of the processing described herein. The computer 900 includes a processor 902, a volatile memory 904, a non-volatile memory 906 (e,g., hard disk), an output device 907 and a graphical user interface (GUI) 908 (e.,g., a mouse, a keyboard, a display, for example). The non-volatile memory 906 stores computer instructions 912, an operating system 916 and data 918. In one example, the computer instructions 912 are executed by the processor 902 out of volatile memory 904. In one embodiment, an article 920 comprises non-transitory computer-readable instructions.

Processing may be implemented in hardware, software, or a combination of the two, Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data. entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system, All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
receiving a flight plan from an aircraft;
relaying, using a computer processor, clearance of the flight plan to the aircraft;
setting a beacon code on a transponder on the aircraft without voice communication;
receiving an acknowledgement of the beacon code setting from the aircraft;
sending an acknowledgement to the aircraft;
setting a new beacon code on the transponder without voice communication; and
receiving a new acknowledgement of the new beacon code from the aircraft.

2. The method according to claim 1, further including setting the new beacon code when the aircraft is en route.

3. The method according to claim 1, further including generating information for a user interface to display an indication that the transponder on the aircraft is capable of receiving beacon code updates without voice communication.

4. The method according to claim 1, further including setting the new beacon code in response to a request from the aircraft.

5. The method according to claim 1, further including maintaining a database of aircraft call signs and associated beacon codes.

6. The method according to claim 1, further including communicating with the aircraft via a datalink.

7. An air traffic control system, comprising:
a flight data processor to process flight plan for an aircraft;
a beacon code module coupled to the flight data processor, the flight data processor and the beacon code module configured to:
receive a flight plan from the aircraft;
relay clearance of the flight plan to the aircraft;
set a beacon code on a transponder on the aircraft without voice communication;
receive an acknowledgement of the beacon code setting from the aircraft;
send an acknowledgement to the aircraft;
set a new beacon code on the transponder without voice communication; and
receive a new acknowledgement of the new beacon code from the aircraft.

8. The system according to claim 7, wherein the beacon code module is further configured to set the new beacon code when the aircraft is en route.

9. The system according to claim 7, further including a display having an indicator for indicating whether the transponder on the aircraft is capable of receiving beacon code updates without voice communication.

10. The system according to claim 7, further including a database of aircraft call signs and associated beacon codes.

11. The system according to claim 7, wherein the beacon code module is further configured to generate a beacon code change message with information to enable the aircraft to translate the message for processing by the transponder.

12. The system according to claim 7, wherein the beacon code module is further configured to set the new beacon code in response to a request from the aircraft.

13. A method, comprising:
transmitting a flight plan by an aircraft to an air traffic control system;
receiving, using a computer processor, clearance of the flight plan for the aircraft;
receiving, by a transponder on the aircraft, a beacon code change from the air traffic control system without voice communication;
receiving a confirmation indication from a user for the beacon code change;
updating the beacon code based on the beacon code change without voice communication with air traffic control;
generating a confirmation message of the beacon code update to the air traffic control;

receiving a new beacon code change when the aircraft is en route; and updating the new beacon code in transponder without voice communication.

14. The method according to claim 13, wherein the transponder is configured to receive datalink messages from the air traffic control system.

15. The method according to claim 13, further including receiving user confirmation for the new beacon code.

16. The method according to claim 13, further including providing an indicator to indicate that a beacon code change has been sent by the air traffic control.

* * * * *